(12) United States Patent
Vroon

(10) Patent No.: US 9,718,236 B2
(45) Date of Patent: Aug. 1, 2017

(54) METHOD OF MANUFACTURING CUSTOM SIZED PLASTIC TOTE HAVING INTERMEDIATE SLEEVE

(71) Applicant: Bradford Company, Holland, MI (US)

(72) Inventor: William J. Vroon, Holland, MI (US)

(73) Assignee: Bradford Company, Holland, MI (US)

( * ) Notice: Subject to any disclaimer, the term of this patent is extended or adjusted under 35 U.S.C. 154(b) by 120 days.

(21) Appl. No.: 14/950,829

(22) Filed: Nov. 24, 2015

(65) Prior Publication Data

US 2016/0075082 A1    Mar. 17, 2016

Related U.S. Application Data

(63) Continuation of application No. 14/613,896, filed on Feb. 4, 2015, now Pat. No. 9,227,364, which is a
(Continued)

(51) Int. Cl.
*B29C 65/72* (2006.01)
*B29C 45/00* (2006.01)
(Continued)

(52) U.S. Cl.
CPC .............. *B29C 65/72* (2013.01); *B23P 15/00* (2013.01); *B29C 45/0055* (2013.01); *B29C 65/08* (2013.01); *B29C 65/56* (2013.01); *B29C 65/60* (2013.01); *B29C 66/1222* (2013.01); *B29C 66/1224* (2013.01); *B29C 66/21* (2013.01); *B29C 66/5344* (2013.01); *B29C 66/53461* (2013.01); *B29C 66/542* (2013.01); *B29C 66/543* (2013.01); *B29C 66/72523* (2013.01); *B29C 66/8322* (2013.01); *B65D 11/10* (2013.01); *B65D 11/105* (2013.01);
(Continued)

(58) Field of Classification Search
CPC ......... Y10T 29/49956; Y10T 29/49826; Y10T 29/49716; Y10T 29/49721; Y10T 29/49817; B29C 65/20; B29C 66/0044; B29C 66/54; B29C 66/543; B65D 11/10
USPC ... 29/401.1, 402.09, 402.07, 402.06, 402.11, 29/402.12, 402.13, 525.01, 525.06; 220/628, 618, 616, 640, 643, 644, 220/4.28–4.34; 206/499
See application file for complete search history.

(56) References Cited

U.S. PATENT DOCUMENTS 876,235 A    1/1908  Quackenboss
913,334 A    2/1909  Wege
(Continued)

FOREIGN PATENT DOCUMENTS

BE    887814     7/1981
WO    9731831    9/1997

*Primary Examiner* — Jason L Vaughan
(74) *Attorney, Agent, or Firm* — Wood, Herron & Evans. LLP

(57) ABSTRACT

A method of manufacturing a custom sized plastic tote lighter in weight than heretofore known custom sized plastic totes is provided. The method comprises separating an injection molded tote into upper and lower portions by cutting the injection molded tote. A sleeve or middle portion of plastic material is secured to the upper and lower portions of the injection molded tote to create a custom sized plastic tote of a desired height. Alternatively, portions of different injection molded totes may be used to create a custom sized plastic tote. The sleeve may be made from different materials and may be made of multiple pieces.

20 Claims, 10 Drawing Sheets

Related U.S. Application Data continuation of application No. 14/177,529, filed on Feb. 11, 2014, now Pat. No. 8,966,732, which is a continuation of application No. 14/102,913, filed on Dec. 11, 2013, now Pat. No. 8,973,236, which is a continuation of application No. 13/393,775, filed on Jul. 11, 2013, now Pat. No. 9,126,371, which is a continuation of application No. 13/363,659, filed on Feb. 1, 2012, now Pat. No. 8,523,004, which is a continuation of application No. 12/728,733, filed on Mar. 22, 2010, now Pat. No. 8,112,859.

(60) Provisional application No. 61/162,898, filed on Mar. 24, 2009.

(51) Int. Cl.

| | | |
|---|---|---|
| *B29C 65/08* | (2006.01) | |
| *B29C 65/60* | (2006.01) | |
| *B29C 65/00* | (2006.01) | |
| *B65D 6/00* | (2006.01) | |
| *B23P 15/00* | (2006.01) | |
| *B29C 65/56* | (2006.01) | |
| *B29L 31/00* | (2006.01) | |
| *B26D 1/00* | (2006.01) | |

(52) U.S. Cl.
CPC ............ *B26D 1/00* (2013.01); *B29C 66/71* (2013.01); *B29C 66/7392* (2013.01); *B29C 2045/0067* (2013.01); *B29C 2793/00* (2013.01); *B29C 2793/009* (2013.01); *B29C 2793/0081* (2013.01); *B29L 2031/7126* (2013.01); *B29L 2031/7162* (2013.01); *Y10T 29/49716* (2015.01); *Y10T 29/49721* (2015.01); *Y10T 29/49815* (2015.01); *Y10T 29/49817* (2015.01); *Y10T 29/49826* (2015.01); *Y10T 29/49956* (2015.01)

(56) References Cited

U.S. PATENT DOCUMENTS

| | | |
|---|---|---|
| 2,130,019 A | 9/1938 | Meier |
| 2,160,631 A | 5/1939 | Woolsey |
| 2,823,049 A | 2/1958 | Hombach |
| 2,968,397 A | 1/1961 | Cantrell, Sr. |
| 2,989,226 A | 6/1961 | Swartz |
| 3,024,938 A | 3/1962 | Watter |
| 3,266,656 A | 8/1966 | Kridle |
| 3,454,439 A | 7/1969 | Keene |
| 3,622,037 A | 11/1971 | Gildart |
| 3,913,774 A | 10/1975 | Vajtay |
| 3,986,659 A | 10/1976 | Vajtay |
| 4,120,119 A | 10/1978 | Engel |
| 4,201,306 A | 5/1980 | Dubois et al. |
| 4,265,842 A | 5/1981 | Summo |
| 4,267,223 A | 5/1981 | Swartz |
| 4,673,087 A | 6/1987 | Webb |
| 4,682,727 A | 7/1987 | Stoll |
| 4,692,195 A | 9/1987 | Allen et al. |
| 4,762,249 A | 8/1988 | Fortuna et al. |
| 4,880,580 A | 11/1989 | Bowers et al. |
| 5,199,593 A | 4/1993 | Kita |
| 5,228,585 A | 7/1993 | Lutgen et al. |
| 5,244,108 A | 9/1993 | Hale |
| 5,265,797 A | 11/1993 | Velge et al. |
| 5,297,680 A | 3/1994 | Butterfield et al. |
| 5,474,196 A | 12/1995 | Fausel et al. |
| 5,487,471 A | 1/1996 | Marchek et al. |
| 5,538,178 A | 7/1996 | Zink et al. |
| 5,590,450 A | 1/1997 | March |
| 5,638,983 A | 6/1997 | Bazany |
| 5,680,948 A | 10/1997 | Schmidt et al. |
| 5,829,595 A | 11/1998 | Brown et al. |
| 5,852,895 A | 12/1998 | Sinanan |
| 5,908,135 A | 6/1999 | Bradford et al. |
| 5,996,835 A | 12/1999 | Farrington et al. |
| 6,032,799 A | 3/2000 | Bellum et al. |
| 6,055,713 A | 5/2000 | Genei |
| 6,227,397 B1 | 5/2001 | Kim |
| 6,592,025 B2 | 7/2003 | Bazany et al. |
| 6,805,254 B2 | 10/2004 | Tanzer et al. |
| 6,926,194 B2 | 8/2005 | Lane |
| 6,991,127 B2 | 1/2006 | Huang |
| 7,004,344 B2 | 2/2006 | Fulton et al. |
| 7,360,663 B2 | 4/2008 | Vroon |
| 7,503,462 B2 | 3/2009 | Vroon |
| 7,556,166 B2 | 7/2009 | Parnall et al. |
| 8,112,859 B2 | 2/2012 | Vroon |
| 8,146,224 B1 | 4/2012 | Vroon |
| 8,523,004 B2 | 9/2013 | Vroon |
| 8,966,732 B2 | 3/2015 | Vroon |
| 8,973,236 B2 | 3/2015 | Vroon |
| 9,227,364 B2 | 1/2016 | Vroon |
| 2005/0017000 A1 | 1/2005 | Vergiels et al. |
| 2007/0221719 A1 | 9/2007 | Vroon et al. |
| 2007/0221721 A1 | 9/2007 | Bradford |

METHOD OF MANUFACTURING CUSTOM SIZED PLASTIC TOTE HAVING INTERMEDIATE SLEEVE

CROSS REFERENCE TO RELATED APPLICATIONS

This application is a continuation of U.S. patent application Ser. No. 14/613,896 filed Feb. 4, 2015, which is a continuation of U.S. patent application Ser. No. 14/177,529 filed Feb. 11, 2014, now U.S. Pat. No. 8,966,732, which is a continuation of U.S. patent application Ser. No. 14/102,913 filed Dec. 11, 2013, now U.S. Pat. No. 8,973,236, which is a continuation of U.S. utility patent application Ser. No. 13/939,775 filed Jul. 11, 2013, now U.S. Pat. No. 9,126,371, which is a continuation of U.S. patent application Ser. No. 13/363,659 filed Feb. 1, 2012, now U.S. Pat. No. 8,523,004, which is a continuation of U.S. patent application Ser. No. 12/728,733 filed Mar. 22, 2010, now U.S. Pat. No. 8,112,859, which claims the benefit of the filing of U.S. provisional Patent Application Ser. No. 61/162,898, filed Mar. 24, 2009, which are each fully incorporated herein.

FIELD

The present invention relates to a tote for use in shipping products.

BACKGROUND

Injection molded totes are designed to hold parts or products for shipment and/or storage. One exemplary use is in the automobile manufacturing industry. For example, the injection molded tote may be used several times for transporting parts between a part supplier and an automobile or other product assembly plant.

Injection molded totes have a finite usable life. When the injection molded tote becomes damaged and is no longer useful, the tote is either discarded or ground up as a means of recycling the plastic. Alternatively, the injection molded tote may become obsolete or unwanted if the parts for which the tote is designed are discontinued and the injection molded tote does not adequately fit another part.

Injection molded totes are made in a limited number of sizes or footprints, and may be color coded to indicate different sizes. The sizes are limited so they fit in a desired manner inside a standard pallet footprint for shipping purposes, which is commonly 48 inches by 45 inches. Therefore, some popular footprints or sizes for injection molded totes are: 24 inches by 22 inches (four totes per layer arranged 2×2) and 24 inches by 15 inches (six totes per layer arranged 3>2), among others. Because these sizes are finite, finding a used injection molded tote of a suitable size and color may be difficult.

Injection molded totes are made in a limited number of heights so that when loaded and stacked, the height of the pallet load is between 48 and 52 inches or close. For example, one common load is 11 inch tall injection molded totes stacked four high. Injection molded tote tooling is very expensive. In addition, making such tooling for tall injection molded totes (say 23 inches) is difficult.

It is known to take two standard sized injection molded totes of the same footprint (length×width), but of different heights, cut them and weld them together to create a custom sized height. One difficulty with using this method to create an injection molded tote of a custom height is that the resulting tote is relatively heavy and, therefore, costly to transport when compared to a tote of the same height manufactured in accordance with the present invention.

What is needed in the art is a method of manufacturing a custom sized plastic tote from one or more unwanted, obsolete, or damaged injection molded totes. The resulting tote is lighter and, therefore, cheaper and easier to transport than known cut and welded injection molded totes.

SUMMARY

The present invention provides a method of manufacturing a custom sized plastic tote from one or more injection molded totes. These standard sized injection molded totes may be unwanted, obsolete, or damaged injection molded totes. According to one aspect of the invention, a custom sized plastic tote of a desired height is made by separating an upper portion of an injection molded tote from a lower portion of the injection molded tote. The next step is inserting a sleeve or middle portion of the custom sized plastic tote between the upper and lower portions of the injection molded tote. The next step is securing the middle portion of the custom sized plastic tote to the upper and lower portions of the injection molded tote to create a custom sized plastic tote of a desired height.

According to another aspect of the invention, the method of manufacturing a custom sized plastic tote of a desired height comprises cutting a first injection molded tote, separating the first injection molded tote into an upper portion and a lower portion. The next step comprises securing one of the upper and lower portions of the first injection molded tote to a plastic sleeve. The last step comprises securing a portion of a second injection molded tote to the sleeve to complete the custom sized plastic tote.

According to another aspect of the invention, the method of manufacturing a custom sized plastic tote of a desired height comprises cutting first and second injection molded totes, separating each of the injection molded totes into an upper portion and a lower portion. The next step comprises securing one of the upper and lower portions of the first injection molded tote to a plastic sleeve. The last step comprises securing one of the upper and lower portions of the second injection molded tote to the plastic sleeve. The unused portions of the first and second injection molded totes are not used to manufacture the custom sized plastic tote.

The sleeve of the custom sized plastic tote may be made of multiple pieces of plastic or only one piece of plastic. Securing the upper and/or lower portions of the injection molded tote or totes to the sleeve may be done by any suitable means known in the industry. For example, the upper and/or lower portions of the injection molded tote or totes may be secured to the middle sleeve by riveting, welding, or gluing, to name a few. The middle sleeve, therefore, separates the upper and lower portions of the injection molded totes used to create the customized tote.

In one embodiment, the middle sleeve may be made of corrugated plastic with the corrugations and flutes extending vertically, thereby enabling the custom sized plastic tote to withstand high compression forces that are encountered when the totes are stacked one on another. Advantageously, stacking strength enables multiple loaded totes to be stacked upon each other without damage to the totes or to any parts therein. Because the corrugated plastic sleeve is made of polyethylene, the same material from which the upper and lower sections of the customized tote are made, the sleeve may be sonic welded at spots to the injection molded tote pieces.

According to another aspect of the present invention, the sleeve may be made of trilaminate materials, such as Con-Pearl®. Because Con-Pearl® is made of polypropylene, which does not weld to polyethylene, the sleeve may be riveted to the injection molded tote pieces of the customized plastic tote.

Another aspect of the present invention is color coding. The custom sized plastic tote may be assembled with the middle sleeve and/or its top or bottom pieces from injection molded totes being a chosen color which communicates either the size or contents inside the custom sized plastic tote. Such color coding may provide the same color code scheme as the injection molded tote or totes.

DETAILED DESCRIPTION OF THE DRAWINGS

Figure 1:
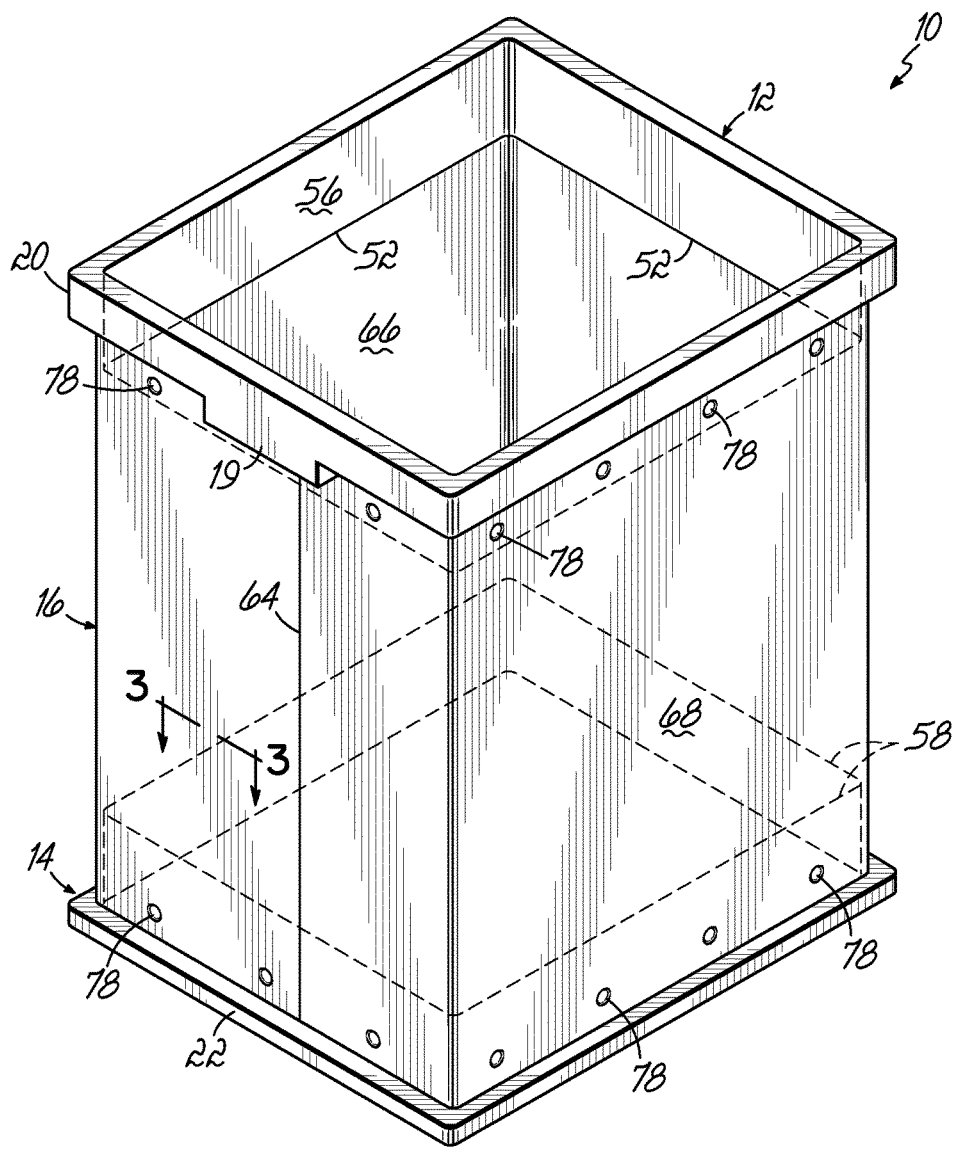
FIG. 1 is a front perspective view of one embodiment of a custom sized plastic tote in accordance with the present invention.

Referring to FIG. 1, there is illustrated a custom sized plastic tote 10 according to one embodiment of the invention. The custom sized plastic tote 10 includes an upper portion, referred to as a rail 12; a lower portion, referred to as a tray 14, and a middle portion or sleeve 16 secured to the rail 12 and tray 14.

Figure 2A:
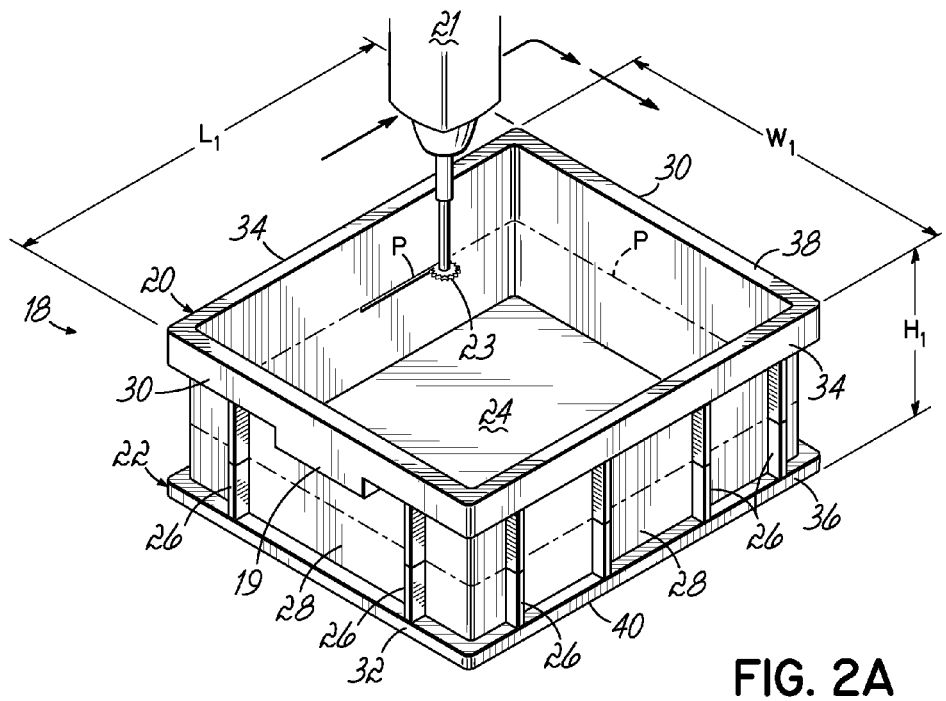
FIG. 2A is a front perspective view of an injection molded tote being cut into upper and lower portions.

In one embodiment, the custom sized plastic tote 10 includes the components of one injection molded tote 18 shown in FIG. 2A. The injection molded tote 18 may be a used tote, a new tote, a partially damaged tote or any combination thereof. This document does not intend to specify the previous use or condition of injection molded tote 18. The injection molded tote 18 has a pair of handles 19, an upper lip 20, a lower lip 22, a floor 24 and a plurality of projections 26 extending generally vertically between the upper and lower lips 20, 22 and protruding outwardly beyond the sidewalls 28. One method of manufacturing the custom sized plastic tote 10 using portions of injection molded tote 18 is shown in FIGS. 2A-2F.

As shown in FIG. 2A, the custom sized plastic tote 10 of FIG. 1 is made by cutting the injection molded tote 18 along a generally horizontal plane "P" (indicated by the dashed line in FIG. 2A) using a movable cutting tool 21 having a rotary blade 23. It will be appreciated by one of ordinary skill in the art that the cutting tool 21 may be stationary, as opposed to movable, and/or may move outside injection molded tote 18 rather than inside injection molded tote 18 and/or may have other types of cutting means, such as a cutting blade that reciprocates rather than rotates. The injection molded tote 18 may be cut or separated into two or more pieces by other methods known in the art of machining.

It will be appreciated by those of ordinary skill in the art that injection molded totes are available in a limited number of sizes as determined by the length ($L_1$), width ($W_1$), and height ($H_1$). As shown in FIG. 2A, $L_1$ generally indicates the distance between the outer surfaces 30, 32 of opposing sides of the upper and lower lips 20, 22, respectively, of injection molded tote 18. $W_1$ generally indicates the distance between the outer surfaces 34, 36 of opposing sides of the upper and lower lips 20, 22, respectively, of injection molded tote 18. $H_1$ generally indicates the distance between the upper surface 38 of the upper lip 20 and the lower surface 40 of the lower lip 22 of injection molded tote 18.

By way of example, injection molded totes have length and width dimensions of about 24 inches by about 15 inches, about 24 inches by about 22 inches, or about 48 inches by about 15 inches. By way of further example, injection molded tote 18 may have a height, $H_1$, of about 4 or more inches. Thus, the rail 12 and the tray 14 may have similar length and width dimensions, though it will be appreciated that the rail 12 may have interior dimensions that are slightly different than the interior dimensions of the tray 14.

Figure 2B:
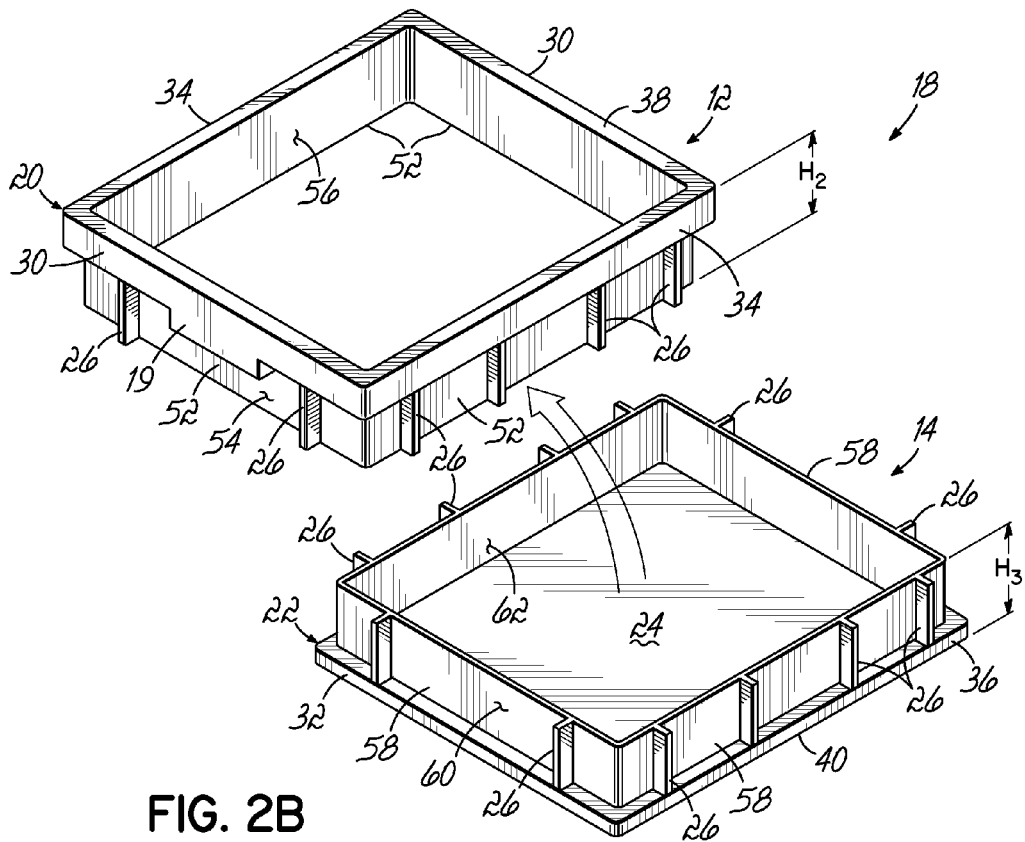
FIG. 2B is a front perspective view of the injection molded tote of FIG. 2A following separation into upper and lower portions.

With reference to FIG. 2B, cutting along generally horizontal plane "P" separates the injection molded tote into two portions, the rail 12 and the tray 14. By way of further example, the tray 14 may have a height, $H_3$, of about 2¾ inches measured on the inside of the tray 14, and the rail 12 may have a height, $H_2$, of about 3 inches. However, it will be appreciated that the height of the rail 12 and tray 14 may depend on the height, $H_1$, of the injection molded tote 18. It will also be appreciated that cutting may remove a portion of the height, $H_1$, such that the sum of the heights $H_2$ and $H_3$ is generally less than $H_1$. Furthermore, cutting may include removing a substantial amount of the material between the rail 12 and the tray 14. As shown in FIG. 2A, projections 26 are cut along the sidewalls 28 of the injection molded tote 18. Although the projections 26 are illustrated as being generally vertically oriented, they may be oriented in other directions and may be other shapes or configurations.

Figure 2C:
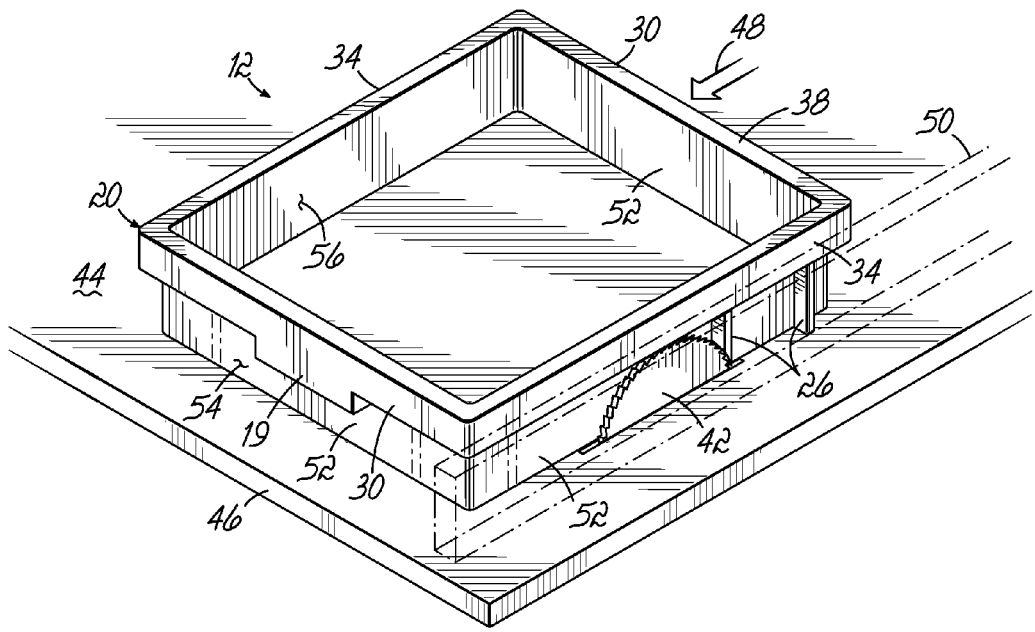
FIG. 2C is a front perspective view of the projections being removed from the upper portion of the injection molded tote of FIG. 2A.
Figure 2D:
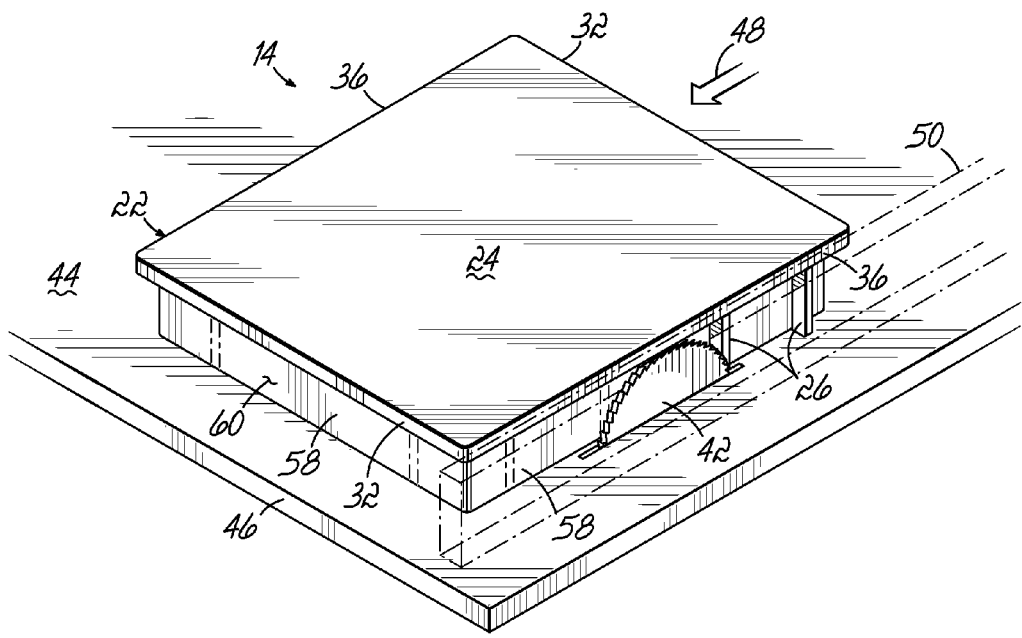
FIG. 2D is a front perspective view of the projections being removed from the lower portion of the injection molded tote of FIG. 2A.

As shown in FIGS. 2C and 2D, in addition to cutting injection molded tote 18 into two separate pieces, portions of the injection molded tote 18 may also undergo additional machining to remove external protrusions 26 extending outwardly from the sidewalls 28. As shown in FIG. 2C, a blade 42 extending above an upper surface 44 of a work table 46 cuts and removes the protrusions, trim or projections 26 along one side of the upper portion or rail 12 of injection molded tote 18 as the rail 12 moves in the direction of arrow 48. This process is repeated four times, one for each side of the rail 12. A guide 50, shown in phantom for clarity, is used to cut the protrusions 26 off the rail 12 to create relatively smooth sidewalls. As shown in FIG. 2D, the same process is used to remove the protrusions, trim or projections 26 from all four sides of the tray 14 of the injection molded tote 18 after tray 14 has been separated from the rail 12 of injection molded tote 18, as shown in FIG. 2B.

Figure 2E:
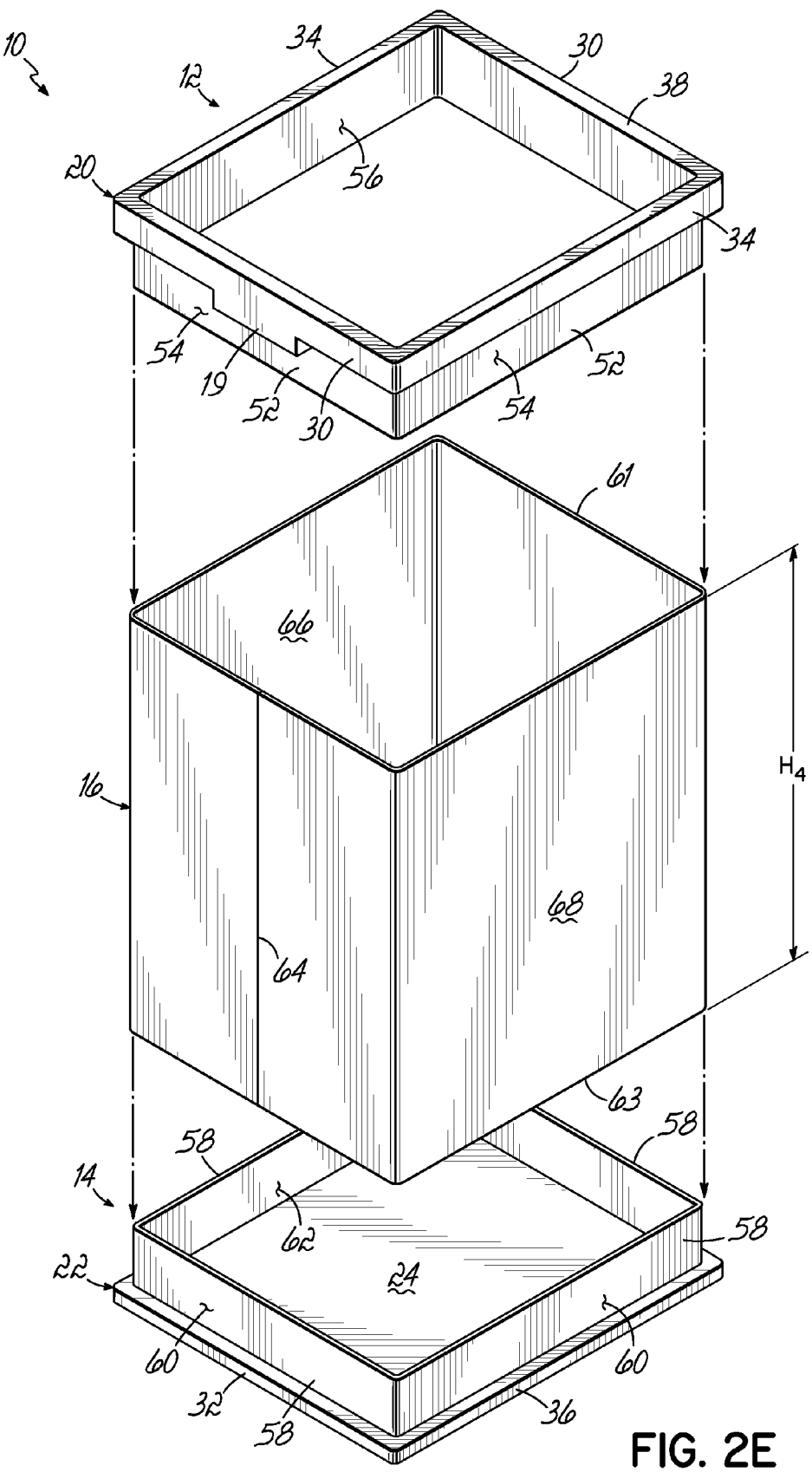
FIG. 2E is a disassembled view of the injection molded tote of FIG. 2A.

As shown in FIG. 2E, this protrusion removal process provides generally rectangular rail 12 with four sidewalls 52 extending downwardly from the upper lip 20, each sidewall 52 having a relatively smooth outer surface 54, as well as a smooth inner surface 56. This protrusion removal process further provides tray 14 with four sidewalls 58 above lower lip 22, each sidewall 58 having a relatively smooth outer surface 60, as well as a relatively smooth inner surface 62.

These relatively smooth outer surfaces 54, 60 of sidewalls 52, 58 of the rail 12 and tray 14, respectively, fit inside the sleeve 16 and are used to secure the components of the custom sized plastic tote 10 of FIG. 1 together. It will be appreciated that the removal of the external protrusions 26, such as projections and trim and cutting injection molded tote 18 into multiple pieces, may be completed in one or more machining operations. Furthermore, robotic equipment or CNC equipment may be utilized to machine the injection molded tote according to the principles described herein.

Figure 2F:
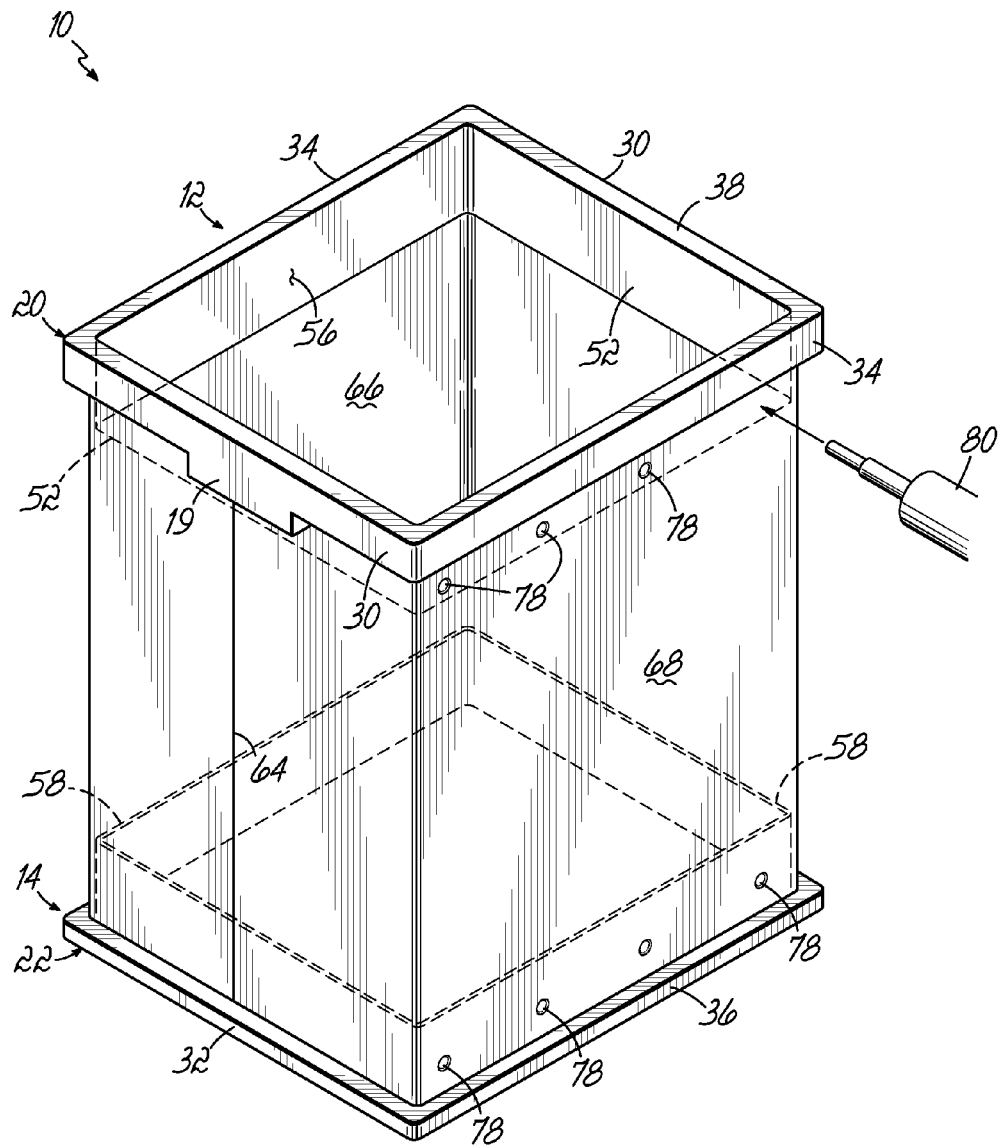
FIG. 2F is a perspective view of the injection molded tote of FIG. 2A being welded together.

FIGS. 1, 2E and 2F show an exemplary embodiment of the sleeve 16 made of one piece of corrugated plastic. However, the sleeve of any of the custom sized plastic totes described herein may be made of multiple pieces of corrugated plastic or other plastic material of any desired dimensions. By way of example, and not limitation, sleeve 16 may be made of high density polyethylene (HDPE). As shown, sleeve 16 is formed by bending a sheet of corrugated plastic material to dimensions that enable the sleeve 16 to fit over the treated or machined (as shown in FIGS. 2C and 2D) sidewalls 52, 58 of the rail 12 and tray 14, respectively. The sleeve 16 has an upper edge 61, a lower edge 63, a smooth inner surface 66 and a smooth outer surface 68. As shown in FIG. 2E, opposed side edges 64 of sleeve 16 are joined together along a vertically oriented seam by welding or any other known method. The height, $H_4$, of sleeve 16, the linear distance between upper and lower edges 61, 63, may be as little as about 2 inches and may be as tall as is practicable in order to protect the selected parts to be stored/transported in the custom sized plastic tote 10 while maintaining sufficient vertical stacking strength.

Figure 3:
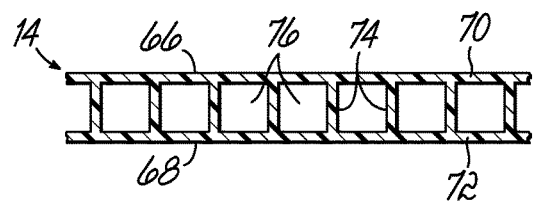
FIG. 3 is a cross-sectional view taken along section line 3-3 of FIG. 1.

FIG. 3 illustrates a cross-section of sleeve 16 in which sleeve 16 is made of plastic corrugated material, the corrugations 76 extending vertically. Vertically oriented corrugations 76 provide stacking strength, thereby enabling the custom sized plastic tote 10 to withstand high compression forces that are encountered when the totes are stacked one on another. If desired, the corrugations may extend horizontally. As shown in FIG. 3, the plastic material of sleeve 16 comprises a pair of generally planar face plies, an inner face ply 70 and an outer face ply 72. A plurality of vertically oriented corrugations or partitions 74 extending between the inner and outer face plies 70, 72 define a plurality of channels or flutes 76.

As shown in FIGS. 2E and 2F, upper and lower portions of sleeve 16 fit over the treated or machined sidewalls 52, 58 of the rail 12 and tray 14, respectively, and are secured to them. As shown in FIGS. 2E and 2F, inner surface 66 of sleeve 16 contacts the treated or machined sidewalls 52, 58 of the rail 12 and tray 14, respectively. The upper and lower edges 61, 63 of the sleeve 16 contact the upper and lower lips 20, 22 of the rail 12 and tray 14, respectively. As shown in FIG. 2F, sleeve 16 is secured to the treated or machined sidewalls 52, 58 of the rail 12 and tray 14, respectively, by sonic welding at select spots or locations 78, using a welder 80.

By using a sleeve 16 made of polyethylene, the same plastic material as the injection molded tote 18, the sleeve 16 made of corrugated plastic may be sonically welded at spots 78 to the rail 12 and tray 14. The interior dimensions of the rail 12 and the tray 14 are maintained. Alternatively, sleeve 16 may be secured to the rail 12 and the tray 14 by any suitable means known in the industry. For example, the rail 12 and/or tray 14 may be secured to the sleeve 16 by one or more of riveting, welding, or gluing, to name a few. The sleeve 16, therefore, separates the upper and lower portions of the injection molded tote 18 in the custom made tote 10.

Figure 5:
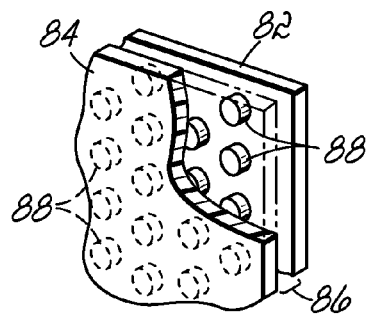
FIG. 5 is a partial perspective view of an alternative material for the sleeve of any of the custom sized plastic totes of the present invention.

According to another aspect of the present invention, the sleeve may be made of a trilaminate material sold under the name Con-Pearl®. FIG. 5 illustrates this plastic material comprising a pair of generally planar face plies, an inner face ply 82 and an outer face ply 84. A middle ply 86 having a plurality of dimples 88 punched therein is sandwiched between the inner and outer face plies 82, 84 and is secured thereto. The dimples 88 extend between the inner and outer face plies 82, 84. Con-Pearl®, as shown in FIG. 5, is made of a polypropylene plastic different than the polyethylene of the injection molded tote 18. Therefore, sleeve 16 must be riveted or secured in some manner other than welding to the rail 12 and tray 14, respectively. Any of the sleeves shown or described herein may be made of Con-Pearl®, or any other trilaminate or other plastic material.

Figure 4A:
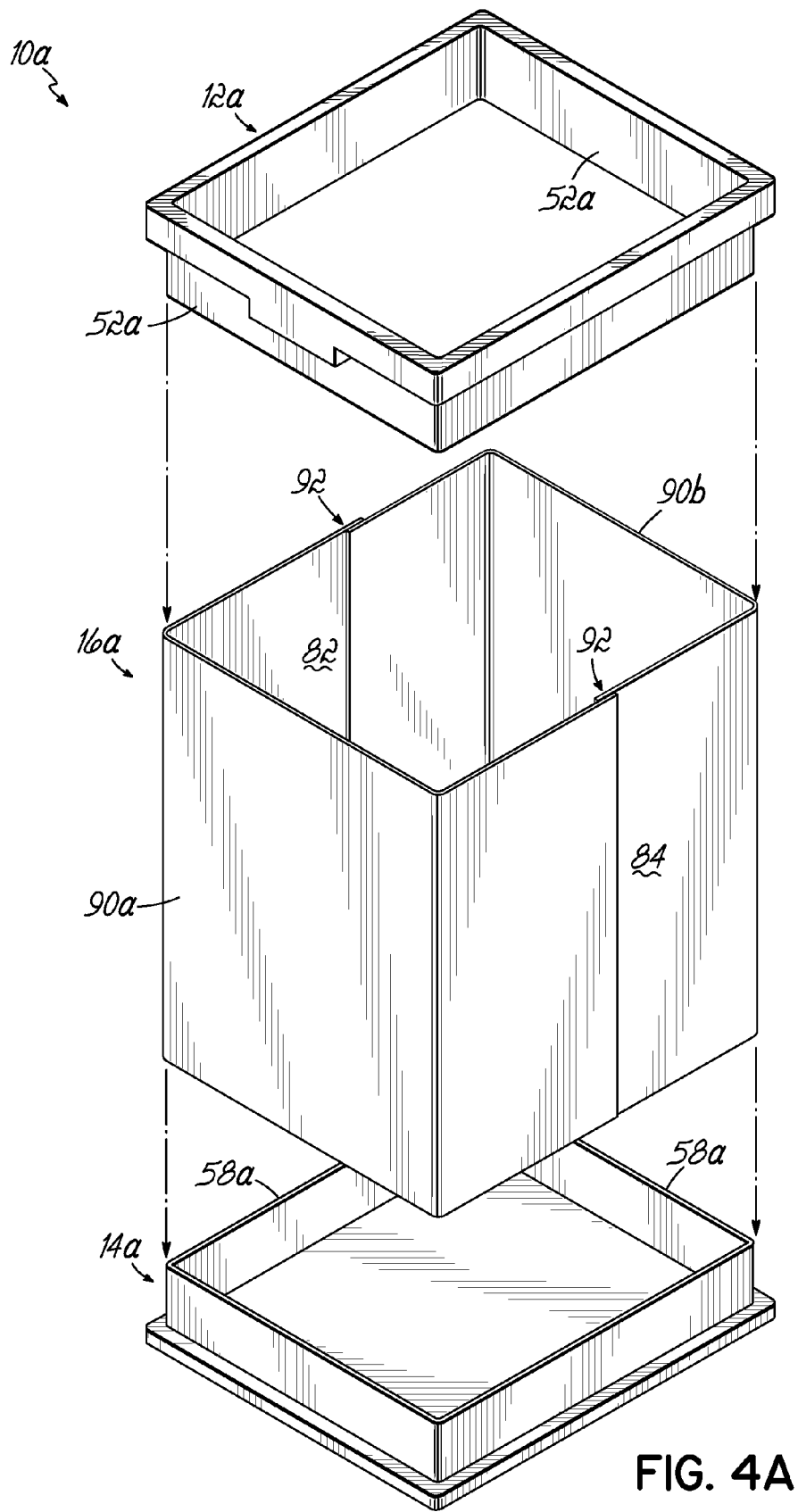
FIG. 4A is a partially disassembled view of an alternative embodiment of a custom sized plastic tote.
Figure 4B:
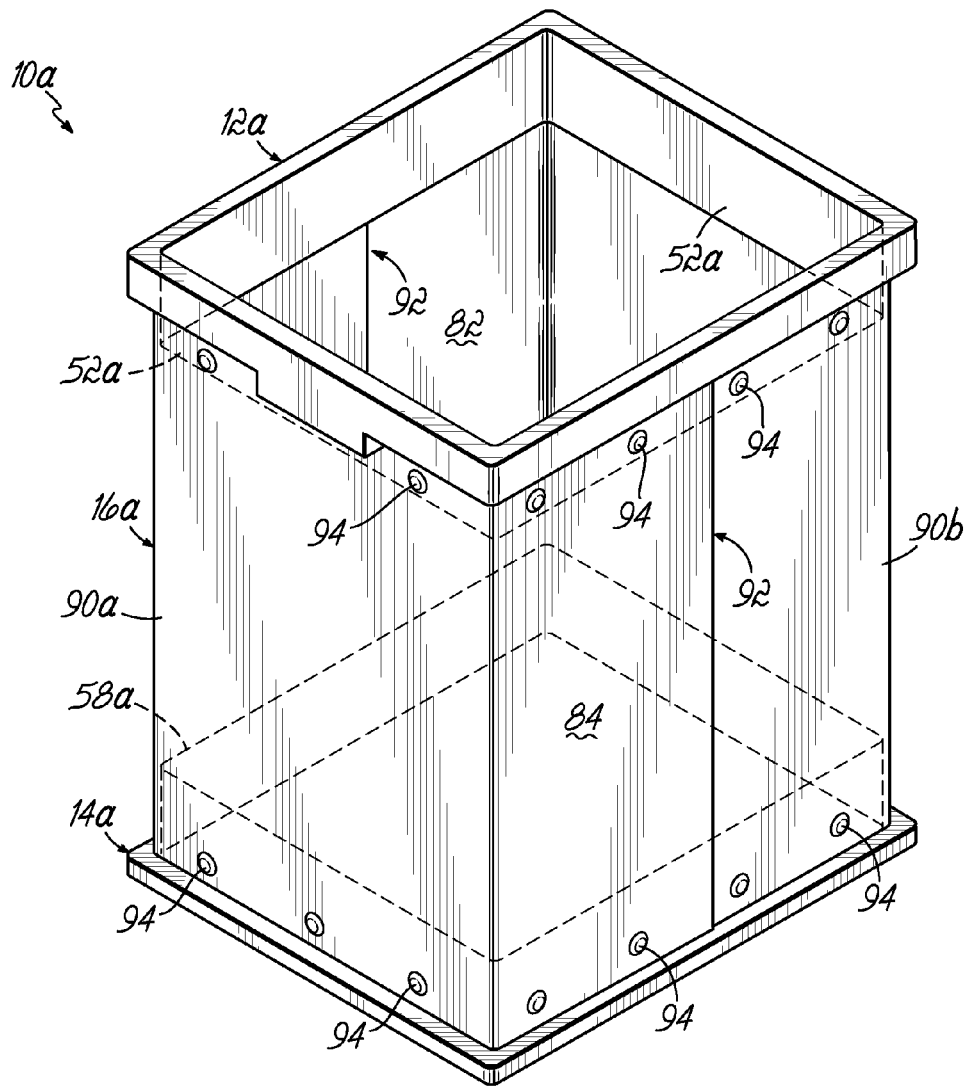
FIG. 4B is a front perspective view of the custom sized plastic tote of FIG. 4A fully assembled.

FIGS. 4A and 4B illustrate another embodiment of custom sized plastic tote 10a being made. This custom sized plastic tote 10a comprises three principal components, like custom sized plastic tote 10, a rail 12a from an injection molded tote, a two-piece sleeve 16a and a tray 14a from an injection molded tote. The rail 12a and tray 14a of custom sized plastic tote 10a may be from the same injection molded tote or different injection molded totes. The sleeve 16a is made from two pieces of plastic material 90a, 90b overlapped in areas 92. As shown in FIG. 4B, the sleeve 16a is riveted with rivets 94 to the treated or machined sidewalls 52a, 58a of the rail 12a and tray 14a. The sleeve 16a may be any type of plastic material described or illustrated herein and/or may be made of any number of desired pieces of plastic material.

Figure 6:
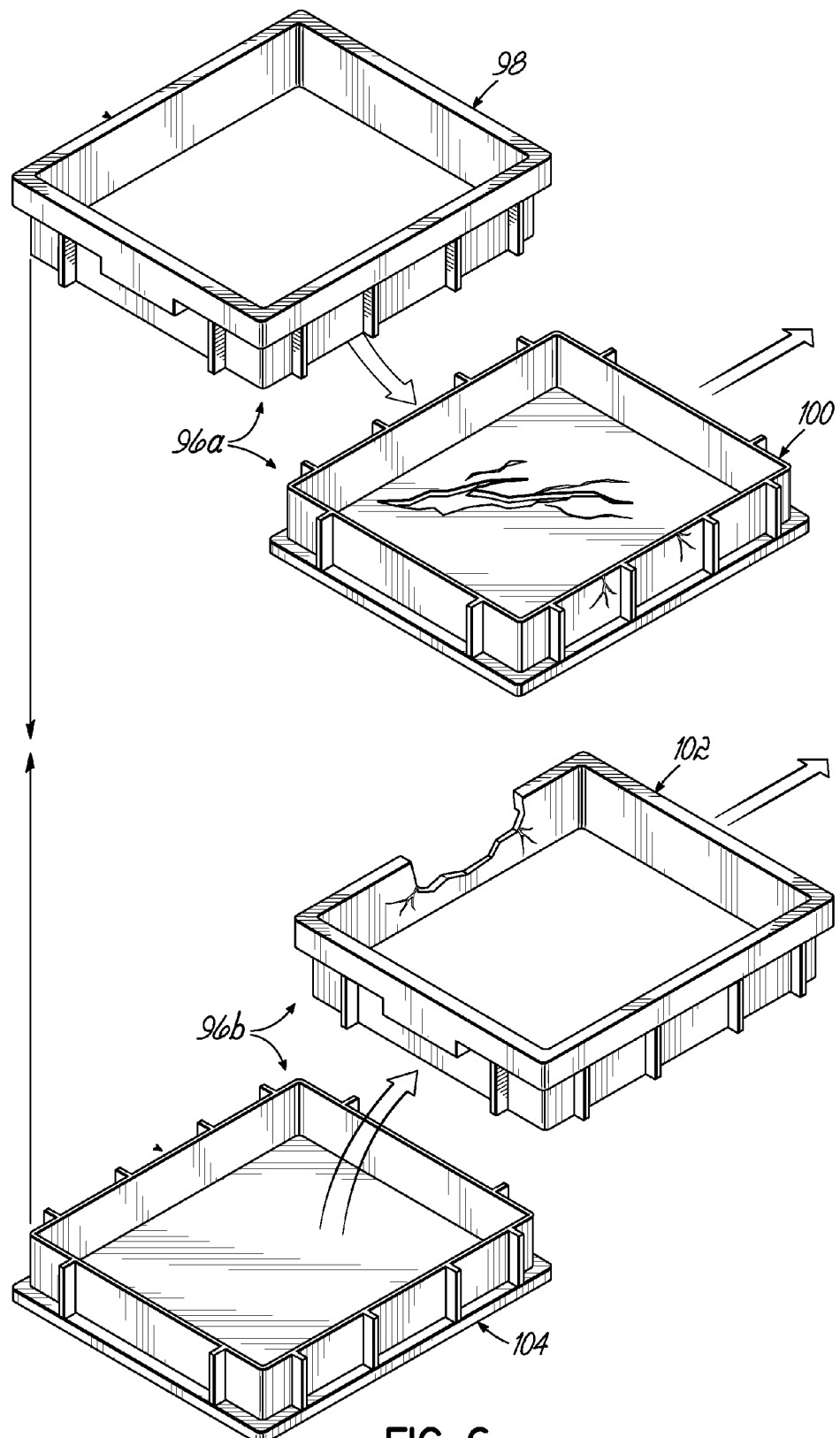
FIG. 6 is a partially disassembled view showing a portion of an alternative method of manufacturing a custom sized plastic tote using two injection molded totes.

FIG. 6 illustrates steps of an alternative method of providing a rail and tray from injection molded totes for use in creating a custom made tote of a desired height in accordance with this invention. Rather than obtain the rail 12 and tray 14 of custom sized plastic tote 10 from one injection molded tote 18, as described above and shown in FIGS. 2A-2B, FIG. 6 shows an alternative method of obtaining a rail and a tray for use in creating a customized plastic tote in accordance with this invention, such as rail 12 and tray 14 of custom sized plastic tote 10. Using this method, the rail 12 and tray 14 of custom sized plastic tote 10 are obtained from two different injection molded totes 96a, 96b, which are illustrated as being partially damaged, but need not be damaged. Injection molded tote 96a is separated into upper and lower portions 98, 100, respectively, as shown in FIG. 2A. The upper portion or rail 98 is treated, as shown in FIG. 2C, to remove exterior protrusions 26. The damaged lower portion 100 of injection molded tote 96a is discarded. Similarly, injection molded tote 96b is separated into upper and lower portions 102, 104, respectively, as shown in FIG. 2A. The lower portion or tray 104 is treated, as shown in FIG. 2D, to remove exterior protrusions 26. The damaged upper portion 102 of injection molded tote 96b is discarded. The treated upper portion of injection molded tote 96a and the treated lower portion of injection molded tote 96b, in combination with a one or multiple piece sleeve of a desired plastic material of a desired height, are used to create a custom sized plastic tote of a desired height.

Figure 7A:
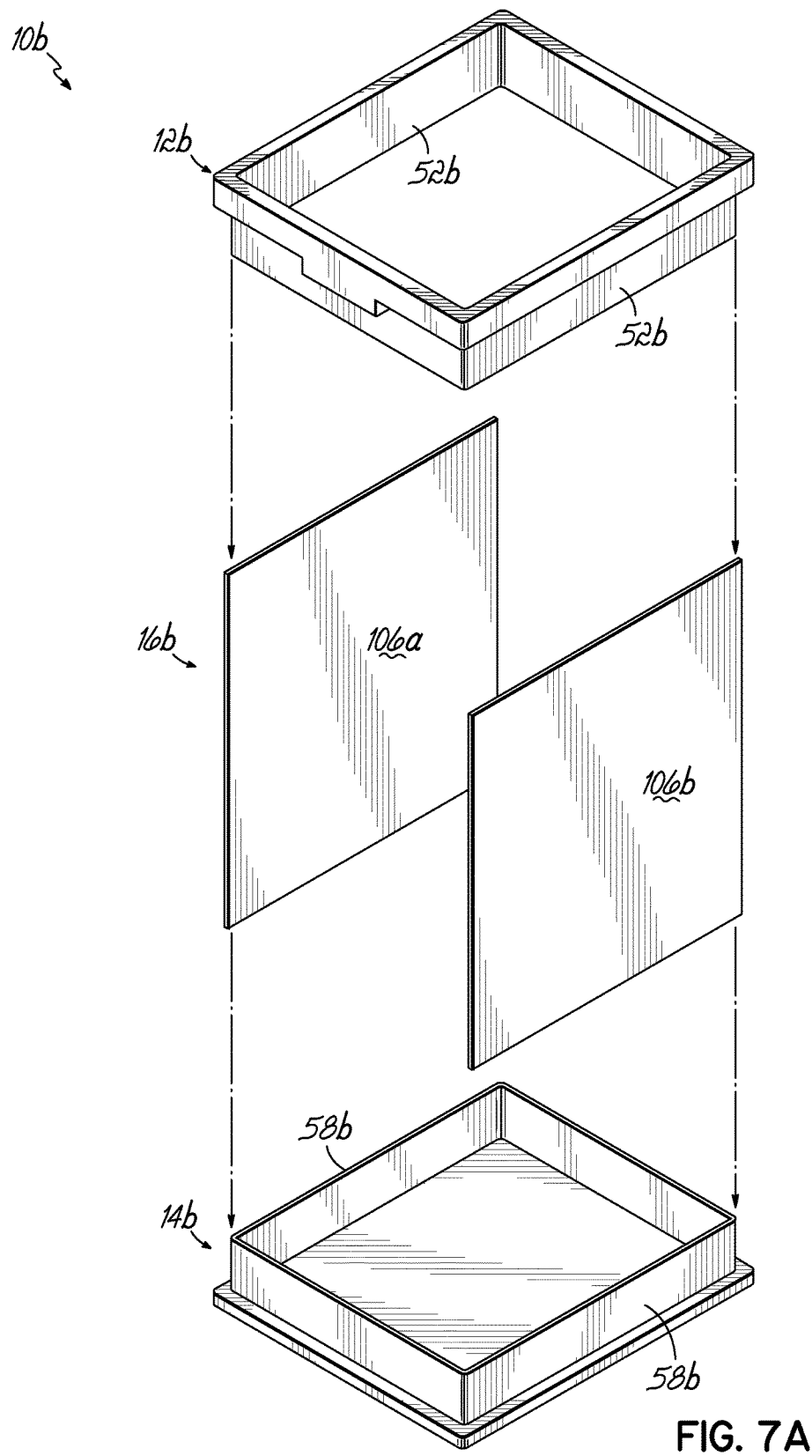
FIG. 7A is a partially disassembled view showing an alternative embodiment of the custom sized plastic tote.
Figure 7B:
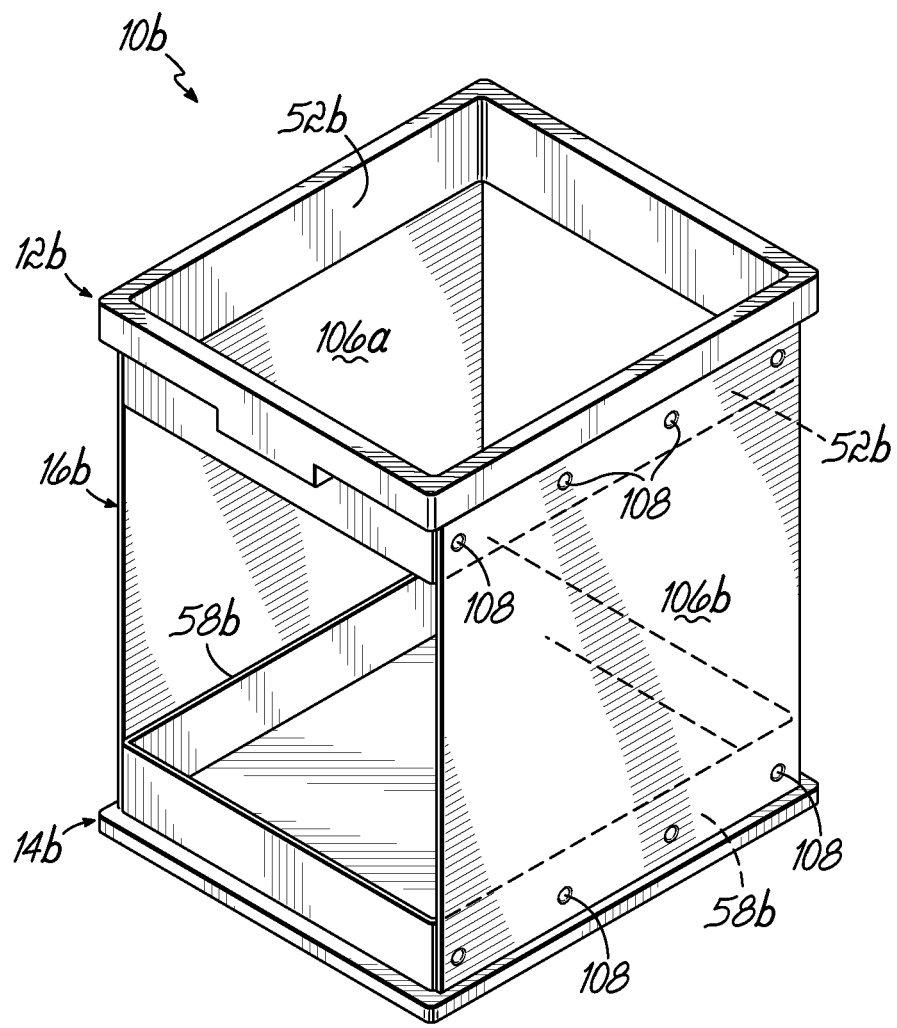
FIG. 7B is a front perspective view of the custom sized plastic tote of FIG. 7A fully assembled.

FIGS. 7A and 7B illustrate another embodiment of custom sized plastic tote 10*b* being made. This custom sized plastic tote 10*b* comprises three principal components, like custom sized plastic totes 10 and 10*a*, a rail 12*b* from an injection molded tote, a two-piece sleeve 16*b* and a tray 14*b* from an injection molded tote. The rail 12*b* and tray 14*b* of custom sized plastic tote 10*b* may be from the same injection molded tote or different injection molded totes. The sleeve 16*b* is made from two generally rectangular pieces of plastic material 106*a*, 106*b* which may be any plastic material described or illustrated herein. As shown in FIG. 7B, the sleeve 16*b* is welded with spot welds 108 to the treated or machined sidewalls 52*b*, 58*b* of the rail 12*b* and tray 14*b*, respectively. Of course, any other securement method, such as rivets, may be used to secure the pieces of plastic material 106*a*, 106*b* to the treated or machined sidewalls 52*b*, 58*b* of the rail 12*b* and tray 14*b*.

In any embodiment of the present invention described or illustrated herein, the custom sized plastic tote may be color coded in a similar manner as the injection molded tote or totes used to make the finished tote.

Accordingly, the invention is to be limited only by the scope of the following claims and their equivalents.

The invention claimed is:

1. A method of manufacturing a custom sized plastic tote comprising:
    cutting a first injection molded tote having sidewalls, an upper lip, a lower lip and a floor to create a rail including the upper lip of the first injection molded tote and a tray including the lower lip and floor of the first injection molded tote;
    separating the rail and tray of the cut first injection molded tote;
    cutting a second injection molded tote having sidewalls, an upper lip, a lower lip and a floor to create a rail including the upper lip of the second injection molded tote and a tray including the lower lip and floor of the second injection molded tote;
    separating the rail and tray of the cut second injection molded tote;
    securing a four-sided plastic sleeve to one of the rail and tray of the first cut injection molded tote and one of the rail and tray of the second cut injection molded tote to form a custom sized plastic tote having an upper portion, a lower portion and a sleeve extending therebetween.

2. The method of claim 1 wherein the sleeve is welded to the upper and lower portions of the custom sized plastic tote.

3. The method of claim 1 wherein the sleeve is made of corrugated plastic.

4. The method of claim 1 wherein the sleeve is made of one piece of material.

5. The method of claim 1 wherein the sleeve is made from multiple pieces of material.

6. The method of claim 5 wherein the sleeve is secured to the upper and lower portions of the custom sized plastic tote with mechanical fasteners.

7. The method of claim 1 further comprising removing exterior protrusions of the first and second injection molded totes.

8. The method of claim 1 wherein the sleeve is welded to the upper and lower portions of the custom sized plastic tote.

9. A method of manufacturing a custom sized plastic tote comprising:
    cutting a first injection molded tote having sidewalls, an upper lip, a lower lip and a floor to create a rail including the upper lip of the first injection molded tote and a tray including the lower lip and floor of the first injection molded tote;
    separating the rail and tray of the cut first injection molded tote;
    cutting a second injection molded tote having sidewalls, an upper lip, a lower lip and a floor to create a rail including the upper lip of the second injection molded tote and a tray including the lower lip and floor of the second injection molded tote;
    separating the rail and tray of the cut second injection molded tote;
    securing a four-sided plastic sleeve to sidewalls of one of the rail and tray of the first cut injection molded tote and sidewalls of one of the rail and tray of the second cut injection molded tote to form a custom sized plastic tote having an upper portion, a lower portion and a sleeve extending therebetween.

10. The method of claim 9 further comprising removing exterior protrusions of the injection molded totes.

11. The method of claim 9 wherein the sleeve is made of a pair of face plies and a middle ply having a plurality of dimples.

12. The method of claim 9 wherein the sleeve is made of one piece of material.

13. The method of claim 9 wherein the sleeve is made from multiple pieces of material.

14. The method of claim 9 wherein the sleeve is made of corrugated plastic.

15. The method of claim 9 wherein the sleeve is welded to the upper and lower portions of the custom sized plastic tote.

16. A method of manufacturing a custom sized plastic tote comprising:
    cutting sidewalls of a first injection molded tote having an upper lip, a lower lip and a floor to create a rail including the upper lip of the first injection molded tote and a tray including the lower lip and floor of the first injection molded tote;
    separating the rail and tray of the cut first injection molded tote;
    cutting sidewalls of a second injection molded tote having an upper lip, a lower lip and a floor to create a rail including the upper lip of the second injection molded tote and a tray including the lower lip and floor of the second injection molded tote;
    separating the rail and tray of the cut second injection molded tote;
    securing a four-sided plastic sleeve to sidewalls of one of the rail and tray of the first cut injection molded tote and sidewalls of one of the rail and tray of the second cut injection molded tote to form a custom sized plastic tote having an upper portion, a lower portion and a sleeve extending therebetween.

17. The method of claim 16 wherein the sleeve is welded to the sidewalls of the upper and lower portions of the custom sized plastic tote.

18. The method of claim 16 wherein the sleeve is made of plastic corrugated material.

19. The method of claim 16 wherein the sleeve is welded to sidewalls of the upper and lower portions of the custom sized plastic tote.

20. The method of claim 16 further comprising removing exterior protrusions of the injection molded totes.

* * * * *